United States Patent [19]
Rhee et al.

[11] 3,835,118
[45] Sept. 10, 1974

[54] SPONGE IRON FRICTION MATERIAL
[75] Inventors: Seong Kwan Rhee, Southfield, Mich.; John P. Kwolek, Troy, N.Y.
[73] Assignee: The Bendix Corporation, South Bend, Ind.
[22] Filed: May 14, 1973
[21] Appl. No.: 360,255

[52] U.S. Cl............ 260/38, 51/298, 106/36, 106/290, 260/DIG. 39
[51] Int. Cl............................................ C08g 51/08
[58] Field of Search ....... 106/36, 290; 260/DIG. 39, 260/38

[56] References Cited
UNITED STATES PATENTS

| | | | |
|---|---|---|---|
| 2,861,964 | 11/1958 | de Gaugue | 106/36 |
| 3,168,487 | 2/1965 | Spokes | 106/36 |
| 3,434,998 | 3/1969 | Aldrich | 106/36 |
| 3,492,262 | 1/1970 | Griffith | 260/38 |
| 3,660,120 | 5/1972 | Clark | 106/36 |

*Primary Examiner*—Allan Lieberman
*Assistant Examiner*—P. R. Michl
*Attorney, Agent, or Firm*—Leo H. McCormick, Jr.; William N. Antonis

[57] ABSTRACT

A semi-metallic friction material for use in a vehicle brake as a friction lining or pad. The semi-metallic friction material utilizes the abrasive surface produced in coarse sponge iron to provide a high coefficient of friction and good wear resistance up to 250°F to compliment the coefficient of friction and wear resistance capable of being produced by the interaction of metallic and ceramic powders, steel fibers, rubber particles and graphite above 250°F.

7 Claims, 2 Drawing Figures

PATENTED SEP 10 1974 3,835,118

SPONGE IRON FRICTION MATERIAL

BACKGROUND OF THE INVENTION

Friction materials consisting of graphite, metallic, ceramic and rubber powders held together by a thermosetting resin have been used as brake pads in braking systems to provide a uniform coefficient of friction without excessive fade. Such a brake lining material is fully described in U.S. Pat. No. 3,434,998 incorporated herein by reference.

The Department of Transportation of the U.S. Government has proposed that acceptable safe braking distances be reduced. It has been determined that if an organic friction material, such as that disclosed in U.S. application Ser. No. 309,011, incorporated herein by reference, could be modified to provide a high coefficient of friction immediately upon engagement of the wear pads with a mating brake surface, the proposed standards could be met. Frictional modifiers having higher coefficient of friction were tried; however, undesirable side effects such as noise, poor wear, fade, grooving in the mating surfaces and reduced structural strength resulted.

SUMMARY OF THE INVENTION

We have discovered a composition for a semi-metallic friction material wherein coarse sponge iron particles are utilized as a frictional modifier. The abrasive surface of the sponge iron will provide a brake lining with a high coefficient of friction upon initial engagement with a corresponding braking surface. Because the sponge iron particles are unannealed and coarse, initial burnish (low temperature wear) on the friction pad will be reduced. The irregular surface of the coarse sponge iron, which includes minute pin holes, will compliment the noise attenuating component in the semi-metallic friction material to essentially eliminate squeal associated during a frictional engagement. Since the sponge iron particles have a nominal size of between 20 to 80 mesh which tend to rupture under transverse loads, steel fibers in a proportioned relationship with the sponge iron particles are added to the semi-metallic friction material to provide structural unity for the brake lining.

It is, therefore, an object of this invention to provide a semi-metallic base material with a friction modifier consisting of coarse sponge iron particles to increase cold friction and reduce wear when used as a brake pad.

It is another object of this invention to provide a semi-metallic base material for a brake pad having coarse sponge iron particles as the principle component to compliment noise reducing ingredients therein in attenuating sounds created upon the brake pad engaging a corresponding brake member.

It is still a further object of this invention to provide a semi-metallic material having coarse sponge iron particles uniformly distributed therein to provide a high coefficient of friction at low temperatures and steel fibers therein to provide structural unity when the semi-metallic material is used as a brake pad.

It is still a further object of this invention to produce a semi-metallic friction material consisting of a mixture of metallic and ceramic powders, coarse sponge iron, graphite, rubber particles and steel fibers rigidly positioned in a resin matrix for use in a brake pad having a high coefficient of friction upon initial engagement with a corresponding brake member.

These and other objects will become apparent from reading this specification and viewing the drawings.

DETAILED DESCRIPTION OF THE PREFERRED COMPOSITION

Throughout this specification the terms metallic powder and ceramic powder are used to denote a material having a nominal size which will pass through a No. 80 mesh screen and consist of at least 85 percent of a base material with the balance being mainly oxides of the base material. Similarly the term "sponge iron" denotes a material having a nominal size, 85 percent of which will pass through a No. 20 mesh screen, yet will be retained on an 80 mesh screen, and consist of at least 90 percent metallic iron.

Figure 1:
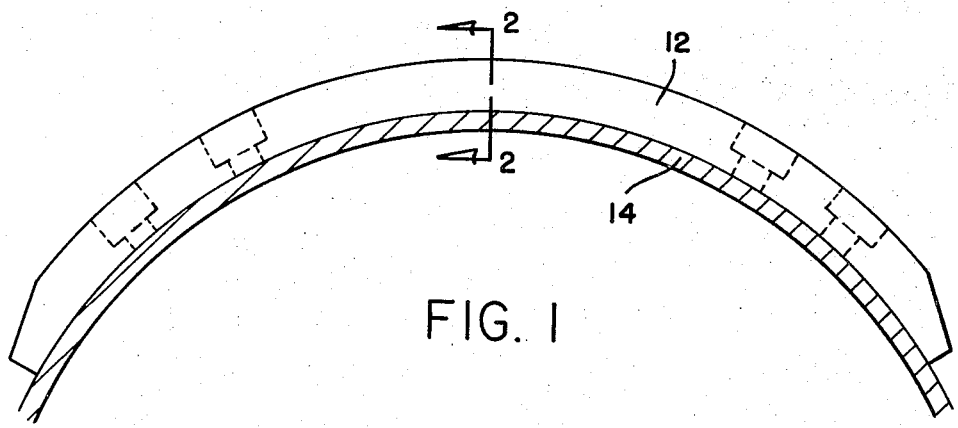
FIG. 1 is a perspective view of a friction pad for use in a brake assembly.
Figure 2:
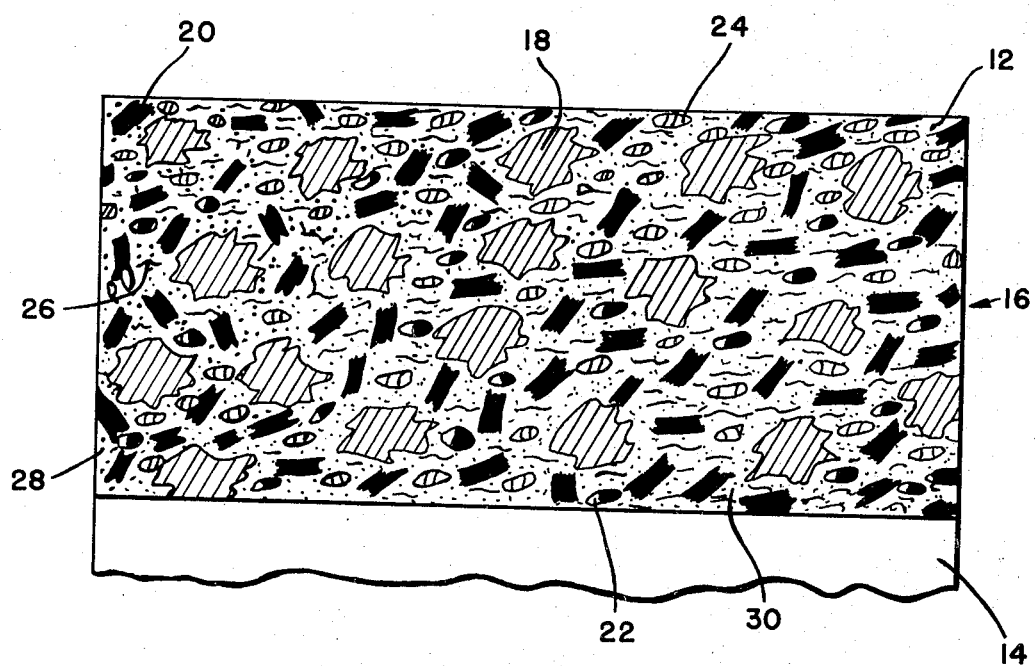
FIG. 2 is an enlarged view taken along line 2—2 of FIG. 1 illustrating the relationship of the compositional ingredients in the friction pad.

The brake pad 12 for a shoe 14 shown in FIG. 1 is constructed of a semi-metallic material whose principal ingredients are sponge iron, graphite and modifiers held together by a thermosetting phenolic resin which is then cured under heat and pressure to form a blended rigid mass 16, as illustrated in FIG. 2. While disc brake pads are not illustrated, test results indicate the same advantages can be found when this material is used on disc brakes.

The sponge iron particles 18 are irregular in shape with a surface having pin hole voids therein. The sponge iron is produced by a method known as the Sieurin process. In this process, powdered magnetite iron ore, carbon, coke and lime are charged in layers into covered crucibles. These ingredients are heated in kilns until reduction is complete. After cooling, the iron produced which is removed will have a physical appearance of a round porous cake about 10 inches in diameter and 2–2½ inches thick. The reduced sponge cakes are then crushed and disintegrated into particles. Hoeganaes Sponge Iron Corporation, Riverton, N.J. produces sponge iron particles that are unannealed, designated M 20/80, having a nominal size which can vary from 20 mesh to 80 mesh have proven satisfactory for brake pads. These sponge iron particles have an abrasive surface sufficient to provide a high coefficient of friction upon initial engagement of the pad 12 with a corresponding braking surface, yet are large enough to resist abrasive wear at low operating temperatures, thereby reducing low temperature wear.

A typical composition for the semi-metallic brake pad 12 is as follows:

|  | Volume Percent | Volume Percent |
|---|---|---|
| Metallic powders (copper, Iron & Zinc) | 1 | 0 to 30 |
| Sponge Iron Particles | 20 | 10 to 40 |
| Ceramic Powders (sillimanite, mullite magnesium oxide, barium sulfate, aluminum oxide and zirconium oxide, silica, iron oxide) | 10 | 2 to 15 |
| Steel Fibers | 10 | 0 to 20 |
| Rubber particles | 6 | 0 to 10 |
| Graphite | 28 | 19 to 39 |

| | Volume Percent | Volume Percent |
|---|---|---|
| Phenolic resin binder | 25 | 13 to 41 |
| | 100% | |

The ingredients are mixed together and formed into a desired shape. Then the mixture is placed in an oven where the resin is cured to hold the other ingredients in a fixed position with respect to each other. After curing the resin the material is shaped into a finished product such as the brake pad 12. The relationship of the various ingredients are illustrated in FIG. 2 as follows: sponge iron particles 18, graphite particles 20, rubber particles 22, ceramic powders 24, steel fibers 26, iron powder 28 and resin 30.

Brake pads manufactured according to a formula as represented above were compared with brake pads of a conventional semi-metallic friction composition wherein the metallic powder constituted about 20% by volume of the total mixture with the following results.

| Material | Coefficient of Friction | | | | Wear (in. × 10-3) for 300 Stops | | | |
|---|---|---|---|---|---|---|---|---|
| | 250°F | 325°F | 475°F | 550°F | 250°F | 325°F | 475°F | 550°F |
| Standard Semi-Metallic | 0.32 | 0.34 | 0.33 | 0.32 | 25 | 15 | 5 | 10 |
| Semi-Metallic/Sponge Iron | 0.38 | 0.36 | 0.35 | 0.32 | 10 | 8 | 5 | 10 |

The importance of providing an initially high coefficient for the brake pads can readily be realized from the following formula through which the effective braking distance on a level roadway may be approximated:

$$d = V^2/30f$$

where:
 $d$ = braking distance in feet
 $V$ = initial speed, miles per hour
 $f$ = coefficient of friction between friction members such as brake pad and drum Assuming that the coefficient of friction will remain substantially uniform the period of time required to bring a vehicle to a stop will be proportionally reduced.

As an example, assume identical vehicles wherein one has brake pads constructed of a standard semi-metallic material and the other of a semi-metallic material with sponge iron particles and both are traveling at 60 miles per hour, the effective braking distance will be as follows:

$$d = 60^{-2}/(30 \times 0.32) = 3600/9.6 = 375'$$

$$d/\text{sponge iron} = 60^{-2}/(30 \times 0.38) = 3600/11.4 = 306'$$

Thus the vehicle with the brake pads having a semi-metallic material with sponge iron particles therein exhibits a shorter effective braking distance which will conform to the proposed stopping distance of the Department of Transportation.

The wear resistance of conventional semi-metallics are equivalent to organic materials between 350° and 450°F and are superior to organics at temperatures above 450°F. However, one of the major obstacles to the accpetance of semi-metallics as a friction material has been the poorer wear resistance of the semi-metallics (compared to organics) when operating at temperatures below 325°F. Average driving seldom results in temperatures above 325°F and is generally considered to generate brake temperatures of around 250°F. Thus, the wear rate of any potentially commercial friction material must be equivalent to organic materials at these lower operating temperatures. The use of coarse sponge iron particles has shown a significant reduction in both the 250°F and 325°F wear levels, thereby improving the chances for commercial acceptance.

As previously discussed, the proposed Department of Transportation reduction in acceptable safe brake stopping distances requires that the brake systems remain balanced throughout the test. This requires a friction material which will exhibit the same friction levels throughout the test. While conventional semi-metallic materials exhibit better friction stability than most organics throughout the test, one problem was found with conventional semi-metallic materials; that was low initial (pre-burnished) friction. As a result, conventional semi-metallic materials were unable to meet the pre-burnished stopping distances proposed by the Department of Transportation. The use of coarse sponge iron particles in semi-metallics have demonstrated significant improvement in initial (pre-burnished) friction, which will be required if semi-metallic materials are to be considered for commercial usage.

Further, upon investigating the semi-metallic material, it was determined that the sponge iron will compliment the rubber particles therein to attenuate noise or squeal caused upon engagement of the brake pad with a corresponding member.

It is assumed that the voids in the sponge iron particles act as acoustical absorbers by breaking up the path through which sounds may travel.

The over-all transverse structural unity of the brake pads may be varied by the amount of steel fiber 26 used in the mixture. However, due to the disparity in price between steel fiber and sponge iron (about 6 times), for mass production a volumetric change in steel fiber content will usually be adjusted by a proportional change in the quantity of sponge iron particles.

Thus, we have developed a semi-metallic composition wherein the structural characteristics are enhanced by the use of sponge iron particles when used as a friction pad in a braking system.

We claim:
1. A semi-metallic base material for use in a vehicle brake as a friction lining, said material consisting of a mixture of:
 metallic powder selected from a group consisting of iron, copper, zinc and mixtures thereof from 0 to 30 percent of the total mixture;
 sponge iron particles from 10 to 40 percent by volume of the total mixture, said particles having a nominal size which can vary from 20 to 80 mesh;

ceramic powders selected from a group consisting of sillimanite, mullite, magnesium oxide, barium sulfate, aluminum oxide, silica, iron oxide and zirconium oxide from 2 to 15 percent by volume of the total mixture;

rubber particles from 0 to 10 percent by volume of the total mixture;

steel fibers from 0 to 20 percent by volume of the total mixture;

graphite particles from 19 to 39 percent by volume of the total mixture, said graphite particles absorbing thermal energy created during engagement of said friction lining with a corresponding member; and a phenolic resin binder from 13 to 41 percent by volume of the total mixture, said phenolic resin binder being responsive to heat to form a solid matrix for holding the selected metallic powders, sponge iron particles, ceramic powders, rubber particles and steel fibers in a fixed relationship.

2. The semi-metallic base material, as recited in claim 1, wherein said sponge iron particles and rubber particles attenuate any noise created during said engagement.

3. The semi-metallic base material, as recited in claim 2, wherein said sponge iron particles, ceramic powder, metallic powders, and steel fibers combine to provide said friction lining with a coefficient of friction between 0.34 to 0.45 in a temperature range up to 250°F.

4. The semi-metallic base materials, as recited in claim 1, wherein said steel fibers constitute between 3 to 16 percent by volume of the total mixture to provide structural unity for the friction lining.

5. The semi-metallic base material, as recited in claim 4, wherein said sponge iron particles uniformly distributed throughout the total mixture are unannealed to provide reduced low temperature wear rates.

6. The semi-metallic base material, as recited in claim 5, wherein said sponge iron particles uniformly distributed throughout the total mixture are to provide increased friction in the preburnished state.

7. The semi-metallic base material, as recited in claim 6, wherein said sponge iron particles uniformly distributed throughout the total mixture are to provide less frictional change from preburnished, to burnished, to faded state.

* * * * *

REEXAMINATION CERTIFICATE (641st)

United States Patent [19]

Rhee et al.

[11] B1 3,835,118

[45] Certificate Issued Mar. 10, 1987

[54] SPONGE IRON FRICTION MATERIAL

[75] Inventors: Seong K. Rhee, Southfield, Mich.;
John P. Kwolek, Troy, N.Y.

[73] Assignee: The Allied Corp.

Reexamination Request:
No. 90/000,898, Nov. 5, 1985
No. 90/000,964, Mar. 7, 1986

Reexamination Certificate for:
Patent No.: 3,835,118
Issued: Sep. 10, 1974
Appl. No.: 360,255
Filed: May 14, 1973

[51] Int. Cl.$^4$ ................................................ C08K 3/22
[52] U.S. Cl. ................................ 523/155; 51/218 R;
51/298; 106/36; 106/290; 523/156; 524/431;
524/432; 524/440

[56] References Cited

U.S. PATENT DOCUMENTS

| | | | |
|---|---|---|---|
| 1,418,607 | 6/1922 | Achtmeyer | 523/152 |
| 2,159,935 | 5/1939 | Sanders | 106/7.5 |
| 2,369,502 | 2/1945 | Walker | 106/36 |
| 2,863,211 | 12/1958 | Wellman | 29/182.3 |
| 2,910,449 | 10/1959 | Evans | 260/38 |
| 2,927,015 | 3/1960 | Wellman | 75/5 |
| 3,210,303 | 10/1965 | Biggs | 260/19 |
| 3,434,998 | 3/1969 | Aldrich | 106/36 |
| 3,494,884 | 2/1970 | Kraft | 260/39 |
| 3,647,033 | 3/1972 | Klein | 188/251 R |
| 3,856,120 | 12/1974 | Kwolek et al. | 188/251 A |

*Primary Examiner*—Paul R. Michl

[57] ABSTRACT

A semi-metallic friction material for use in a vehicle brake as a friction lining or pad. The semi-metallic friction material utilizes the abrasive surface produced in coarse sponge iron to provide a high coefficient of friction and good wear resistance up to 250° F. to compliment the coefficient of friction and wear resistance capable of being produced by the interaction of metallic and ceramic powders, steel fibers, rubber particles and graphite above 250° F.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–7, dependent on an amended claim, are determined to be patentable.

New claims 8–14 are added and determined to be patentable.

1. A semi-metallic base material for use in a vehicle brake as a friction lining, said material consisting of a mixture of:
   metallic powder selected from a group consisting of iron, copper, zinc and mixtures thereof from 0 to 30 percent *by volume* of the total mixture:
   sponge iron particles from 10 to 40 percent by volume of the total mixture, said particles having a nominal size which can vary from 20 to 80 mesh;
   ceramic powders selected from a group consisting of sillimanite, mullite, magnesium oxide, barium sulfate, aluminum oxide, silica, iron oxide and zirconium oxide from 2 to 15 percent by volume of the total mixture;
   rubber particles from 0 to 10 percent by volume of the total mixture;
   steel fibers from 0 to 20 percent by volume of the total mixture;
   graphite particles from 19 to 39 percent by volume of the total mixture, said graphite particles absorbing thermal energy created during engagement of said friction lining with a corresponding member; and
   a phenolic resin binder from 13 to 41 percent by volume of the total mixture, said phenolic resin binder being responsive to heat to form a solid matrix for holding the selected metallic powders, sponge iron particles, ceramic powders, rubber particles and steel fibers in a fixed relationship.

8. *In a friction material having a mixture of ingredients including metallic powder, ceramic powder, rubber particles, steel fiber and carbonaceous particles held in a phenolic resin matrix, the improvement consisting of:*
   *the addition of sponge iron particles comprising 10–40% by volume of the mixture, said sponge iron particles having a nominal size which varies from 20 to 80 mesh and having an abrasive surface which provides a high coefficient of friction on initial engagement of the friction material with a braking surface, said abrasive surface having voids therein which complement the other ingredients in the friction material to attenuate sounds created during the engagement of the friction material with the braking surface.*

9. *In the friction material as recited in claim 8 wherein with a change in the volume of sponge iron in the mixture a proportional change occurs in the steel fiber in order to maintain the structural unity of the friction material when subjected to transverse loads.*

10. *In the friction material as recited in claim 9 wherein said high coefficient of friction is above 0.32 at a temperature of 250° F. generated during the initial engagement.*

11. *A friction material for use in a vehicle brake as a friction lining, said friction material consisting of a mixture of:*
   *metallic powder selected from a group consisting of iron, copper, zinc and mixtures thereof up to 30 percent by volume of the total mixture:*
   *sponge iron particles from 10 to 40 percent by volume of the total mixture, said particles having a nominal size which can vary from 20 to 80 mesh;*
   *ceramic powders selected from a group consisting of sillimanite, mullite, magnesium oxide, barium sulfate, aluminum oxide, silica, iron oxide and zirconium oxide from 2 to 15 percent by volume of the total mixture;*
   *rubber particles up to 10 percent by volume of the total mixture;*
   *steel fibers from up to 20 percent by volume of the total mixture;*
   *graphite particles from 19 to 39 percent by volume of the total mixture, said graphite particles absorbing thermal energy created during engagement of said friction lining with a corresponding member; and*
   *a phenolic resin binder from 13 to 41 percent by volume of the total mixture, said phenolic resin binder being responsive to heat to form a solid matrix for holding the selected metallic powders, sponge iron particles, ceramic powders, rubber particles and steel fibers in a fixed relationship, said sponge iron particles having an abrasive surface which provides a high coefficient of friction on initial engagement of the friction material with a braking surface, said abrasive surface having voids therein which complement the other ingredients in the friction material to attenuate sounds created during the engagement of the friction material with the braking surface.*

12. *In the friction material as recited in claim 11 wherein with a change in the volume of sponge iron in the mixture a proportional change occurs in the steel fiber in order to maintain the structural unity of the friction material when subjected to transverse loads.*

13. *In the friction material as recited in claim 12 wherein said high coefficient of friction is above 0.32 at a temperature of 250° F. generated during the initial engagement.*

14. *In the friction material as recited in claim 13 wherein said nominal size of said sponge iron particles in addition to providing a high coefficient of friction upon initial engagement with a braking surface also resists abrasive wear at low operating temperatures experienced during such initial braking.*

* * * * *